United States Patent
Glenn et al.

(10) Patent No.: US 9,027,138 B2
(45) Date of Patent: May 5, 2015

(54) IDENTIFICATION OF INFECTED DEVICES IN BROADBAND ENVIRONMENTS

(75) Inventors: Michael Glenn, Golden, CO (US); Donald J. Smith, Denver, CO (US); John Butala, Shoreview, MN (US)

(73) Assignee: CenturyLink Intellectual Property LLC, Denver, CO (US)

(*) Notice: Subject to any disclaimer, the term of this patent is extended or adjusted under 35 U.S.C. 154(b) by 144 days.

(21) Appl. No.: 13/538,717

(22) Filed: Jun. 29, 2012

(65) Prior Publication Data

US 2014/0007235 A1   Jan. 2, 2014

(51) Int. Cl.
| | | |
|---|---|---|
| G06F 21/00 | (2013.01) | |
| H04L 29/06 | (2006.01) | |
| G06F 21/56 | (2013.01) | |
| G06F 21/55 | (2013.01) | |

(52) U.S. Cl.
CPC ............ *H04L 63/14* (2013.01); *H04L 63/1441* (2013.01); *H04L 63/0227* (2013.01); *H04L 63/20* (2013.01); *H04L 63/0272* (2013.01); *H04L 63/0281* (2013.01); *G06F 21/56* (2013.01); *G06F 21/564* (2013.01); *G06F 21/562* (2013.01); *G06F 21/55* (2013.01); *G06F 21/568* (2013.01); *G06F 21/561* (2013.01)

(58) Field of Classification Search
CPC ..... H04L 29/068; H04L 29/069; H04L 63/14; H04L 63/20; H04L 63/02; G06F 21/55; G06F 21/56
USPC ........ 726/22–24; 713/187–188; 709/217–229
See application file for complete search history.

(56) References Cited

U.S. PATENT DOCUMENTS

| | | | | |
|---|---|---|---|---|
| 7,093,293 | B1 * | 8/2006 | Smithson et al. | 726/24 |
| 7,263,616 | B1 * | 8/2007 | Brackett | 713/188 |
| 7,636,943 | B2 * | 12/2009 | Gruper et al. | 726/22 |
| 7,735,139 | B1 * | 6/2010 | Chou et al. | 726/24 |
| 8,316,446 | B1 * | 11/2012 | Campbell et al. | 726/24 |
| 2006/0010495 | A1 * | 1/2006 | Cohen et al. | 726/24 |
| 2008/0086776 | A1 | 4/2008 | Tuvell et al. | |
| 2008/0244748 | A1 | 10/2008 | Neystadt et al. | |
| 2009/0282476 | A1 | 11/2009 | Nachenberg et al. | |
| 2010/0154059 | A1 | 6/2010 | McNamee et al. | |
| 2011/0173698 | A1 * | 7/2011 | Polyakov et al. | 726/23 |
| 2011/0314542 | A1 | 12/2011 | Viswanathan et al. | |
| 2012/0117653 | A1 | 5/2012 | Chow et al. | |
| 2012/0131672 | A1 * | 5/2012 | O'Reirdan et al. | 726/23 |
| 2012/0304244 | A1 * | 11/2012 | Xie et al. | 726/1 |

OTHER PUBLICATIONS

Hacker, Andrew J. "Importance of Web Application Firewall Technology for Protecting Web-based Resources." ICSA an independent Division of Verizon Business (2008): 2-3.*

(Continued)

*Primary Examiner* — Madhuri Herzog
(74) *Attorney, Agent, or Firm* — Swanson & Bratschun, L.L.C.

(57) ABSTRACT

Novel solutions for detecting and/or treating malware on a subscriber's premise network. Such solutions can include, but are not limited to, tools and techniques that can detect, and/or enable the detection of, malware infections on individual subscriber devices within the subscriber's network. In a particular embodiment, for example, a premise gateway, or other device on the subscriber's premise network, is configured to analyze packets traveling through the premise gateway and, based on that analysis, identify one or more subscriber devices that are infected with malware.

23 Claims, 6 Drawing Sheets

(56) References Cited

OTHER PUBLICATIONS

International Search Report and Written Opinion prepared by the Korean Intellectual Property Office as International Searching Authority for PCT International Patent Application No. PCT/US2013/048273, mailed Oct. 21, 2013, 12 pages.

International App. No. PCT/US2013/048273; Published Application WO 2014/004883 A1 dated Jan. 3, 2014; 39 pages.

International Appl. No. PCT/US2013/048273; Notice of Publication Jan. 3, 2014; 1 page.

International App. No. PCT/US2013/048273; International Preliminary Report on Patentability dated Jan. 8, 2015; 9 pages.

* cited by examiner

IDENTIFICATION OF INFECTED DEVICES IN BROADBAND ENVIRONMENTS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to online security solutions and more particularly, to tools and techniques for detecting computer malware.

BACKGROUND

In today's connected society, computer malware is a continuing, and increasing, problem. Such malware includes, but is not limited to, computer viruses, trojans, botnets, spyware, and the like. Such malware can create problems not only for the user of an infected computer, but also for other users on the same network and/or across the Internet. Merely by way of example, a computer infected with malware might (or might not) suffer performance issues (e.g., as the malware consumes resources on the infected computer), but such an infected computer can also infect other computers and/or participate in a larger botnet (e.g., as part of a phishing scam, distributed denial of service attack, etc.). In fact, the malware issue has become sufficiently acute that many Internet service providers ("ISP") attempt, either voluntarily, as part of industry agreements and/or standards, and/or in response to government requests/regulations, to diagnose infected subscribers and assist subscribers in treating such infections (i.e., removing the malware from the infected computer).

A typical subscriber (also referred to herein as a customer), however, operates a premise network at the subscriber's premises, whether the premises is a home or business. In many cases, a gateway (described herein as a "premise gateway" or "PG") serves to provide communication between the premise network and the ISP network that provides Internet access for the subscriber. A typical premise gateway is a residential gateway ("RG"), which is disposed at a customer's residence; premise gateways with similar (and/or more robust) functionality might be located in multi-tenant dwellings and/or businesses, in order to provide connectivity for those types of customers. Such gateways (which can be implemented as broadband modems, wireless routers, and the like, often in various combinations) can serve as routers, and in that role, many such gateways provide address translation services for devices (e.g., personal computers, wireless phones, handheld computers, tablet computers, video game consoles, etc.) that are connected to the premise network.

Address translation services, which include but are not limited to Network Address and Port Translation ("NAPT"), provide a valuable function, in that they allow multiple devices on the premise network to send and receive data over the ISP network, without requiring the ISP to allocate a separate IP address for each device. (One skilled in the art should appreciate that a variety of techniques, such as network address translation, ("NAT"), port address translation ("PAT"), IP masquerading, NAT Overload, and many-to-one NAT, can be used to obfuscate a device's actual IP address, for a variety of reasons. Such techniques are generically referred to herein as "NAPT.") Instead, the address translation service in the gateway provides the gateway's own IP address and/or a particular port as the source of outgoing packets, and receives packets for all the devices on the premise network using its own IP address and/or a specific port as the destination address/port, thereafter re-addressing the packets to be distributed within the premise network to each device as appropriate. In addition, the gateways can provide firewall capabilities, blocking some or all access devices behind the gateway. Gateway firewalls can operate in conjunction with or independently from NAPT functionality.

Such services, while conserving scarce network resources, such as IP addresses, create problems for ISPs attempting to diagnose malware infections. For instance, even if an ISP is able to determine that one of its subscribers is using a device with a malware infection, the ISP typically will not be able to determine which device (or devices) on the subscriber's premise network is/are actually infected, because packets traveling over the ISP network from the subscriber's devices all appear as if they originated from the subscriber's gateway, rather than individual devices. Thus, the best an ISP typically can do is to inform a subscriber that there appears to be an infected device on the subscriber's premise network, but the ISP is unable to provide any detailed identification of which of the subscriber's devices are infected. Moreover, subscribers often grow frustrated with such generic information and are unlikely to invest the time or effort necessary to first determine which device or devices may be infected, and second treat infection(s) on such device(s). Hence, despite the best efforts of the ISP, the subscriber's device(s) continue to be infected with malware, and the problem continues to grow.

In light of this situation, one easily can ascertain a need for more robust solutions for detecting and/or treating malware infections on subscriber devices.

BRIEF SUMMARY

A set of embodiments, therefore, provides improved solutions for detecting and/or treating malware on a subscriber's premise network. Such solutions can include, but are not limited to, tools and techniques that can detect, and/or enable the detection of, malware infections on individual subscriber devices within the subscriber's network. In a particular embodiment, for example, a premise gateway, or other device on the subscriber's premise network, is configured to analyze packets traveling through the premise gateway and, based on that analysis, identify one or more subscriber devices that are infected with malware. Because this analysis and action is performed within the subscriber's premise network, such solutions are not affected by the use of NAPT or other address translation techniques within the premise gateway. Moreover, in certain embodiments, the malware detection device (whether the premise gateway or another device on the premise network) can be operated and/or configured by the ISP. As such, these solutions do not require affirmative action by the subscriber to enable the detection of malware, so issues of subscriber diligence and/or competence do not affect malware detection performance.

Certain embodiments employ premise gateway as the malware detection device. Such devices, which can include, without limitation broadband modems, etc., often are designed with very little memory beyond what is required for core gateway functionality. Consequently, it may be infeasible, in many cases, to provide comprehensive malware detection facilities within the gateway. Accordingly, certain embodiments allow for a device within the ISP network to detect a malware infection a particular subscriber premises and/or to identify the type of malware with which the subscriber is infected. The ISP, then, can download to the subscriber's premise gateway (or other malware detection device) malware detection facilities (including, but not limited to, malware signatures heuristic algorithms, and/or the like) that are specific to the detected type of malware. Such embodiments can enable the detection of malware at the subscriber premises without requiring extensive modification of existing premise gateway hardware (e.g., memory, processors, etc.), because the premise gateway need not include an extensive library of generalized malware detection facilities.

Other embodiments can provide facilities to alert a subscriber to the presence of malware within the subscriber's network and/or can help the subscriber identify the particular device(s) on the network that are infected. In some cases, such embodiments can provide assistance to the subscriber in treating the malware infection, e.g., by identifying infected devices (by MAC address, etc.) to the subscriber and/or to a technician at the ISP. Based on the identification, the tool (and/or the technician, e.g., in a chat, telephone call, etc.) can provide malware treatment software and/or instructions (which might be as detailed and/or device-specific as appropriate or desired) to the subscriber to help the subscriber remove the malware from the infected device(s).

The tools provided by various embodiments include, without limitation, devices, methods, systems, and/or software products. Merely by way of example, a method might comprise one or more procedures, any or all of which are executed by a computer system or other device. Correspondingly, an embodiment might provide a computer system configured with instructions to perform one or more procedures in accordance with methods provided by various other embodiments and/or a device so configured. Similarly, a computer program might comprise a set of instructions that are executable by a computer system or other device (and/or a processor therein) to perform such operations. In many cases, such software programs are encoded on physical, tangible and/or non-transitory computer readable media (such as, to name but a few examples, optical media, magnetic media, and/or the like).

Merely by way of example, a method in accordance with one set of embodiments can be used to identify a malware infection. In an exemplary embodiment, the method comprises providing, with a premise gateway, communication between a premise network at a customer premises and an external network outside the customer premises. In an aspect, the premise network might comprise a plurality of customer devices. In some implementations, the method further comprises, analyzing, with a malware detection device at the customer premises, network traffic between the premise network and the external network, and/or identifying, with the malware detection device, one or more infected customer devices that are infected with malware, based on analysis of the network traffic.

Many different architectural arrangements are possible within the scope of various embodiments. Merely by way of example, in some cases, the premise gateway might comprise (and/or function as) the malware detection device. Alternatively and/or additionally, the premise gateway might comprise a broadband modem, a router, a wireless access point, and/or the like. In some embodiments, the malware detection device might comprise a bridge or other device (e.g., a personal computer, embedded appliance, etc.) in the premise network.

In some embodiments, the method might further comprise, taking one or more actions (e.g., with the premise gateway and/or the malware detection device) to notify the customer of an identification of the one or more infected customer devices. Such actions can include, without limitation, blocking network traffic originating from the one or more infected customer devices and/or causing the one or more infected customer devices to display a web page indicating an infected status of the one or more infected customer devices. Alternatively and/or additionally, such actions might include causing a customer device (which might one or might not be one of the infected customer devices) to display a web page indicating an infected status of the one or more infected customer devices. Other actions are possible as well, including (but not limited to), sending an email message to the customer, transmitting a notification to the ISP, and/or the like.

In a particular set of embodiments, the malware detection device might receive a set of one or more malware signatures via the external network (e.g., from the ISP), and analyzing the network traffic might comprise comparing the network traffic against one or more of the malware signatures. Merely by way of example, the ISP (or, more specifically, in some cases, a device within the ISP network) might detect network traffic from the premise gateway indicating a malware infection of one or more of the customer devices. The ISP (and/or the device in the ISP network) might then download the set of one or more malware signatures, in response to detecting network traffic from the premise gateway indicating a malware infection of one or more of the customer devices. In a specific embodiment, the ISP might identify one or more potential malware infections, based on the network traffic from the premise gateway, and/or might select the appropriate one or more malware signatures based on this identification. Alternatively and/or additionally, the malware detection device might analyze network traffic by applying one or more heuristics to the network traffic. Such heuristics might be received by the premise gateway (and/or the malware detection device) over the external network (e.g., from the ISP).

A system in accordance with another set of embodiments might provide a malware detection device (which, as noted above, might be implemented by a premise gateway and/or another device in communication with a premise gateway, to name a few examples). An exemplary malware detection device might comprise one or more second communication interfaces (which could be wired interfaces, wireless interfaces, etc.) to provide communication with an external network outside the customer premises and/or a premise network at a customer premises. In some embodiments, the malware detection device further comprises one or more processors in communication with the first and second communication interfaces and a computer readable medium in communication with the one or more processors, the computer readable medium having encoded thereon a set of instructions executable by the processor for programming the malware detection device to perform one or more operations.

In an exemplary embodiment, the set of instructions might include instructions to perform one or more operations in accordance with methods provided by various embodiments. Such instructions might include, without limitation, some or all of the following: instructions to provide communication between a premise network at a customer premises and an external network outside the customer premises, the premise network comprising a plurality of customer devices; instructions to analyze network traffic between the premise network and the external network; instructions to identify one or more infected customer devices that are infected with malware, based on analysis of the network traffic; and/or instructions to take one or more actions to notify the customer of an identification of the one or more infected customer devices.

An apparatus provided by other embodiments might comprise a non-transitory computer readable medium having encoded thereon a set of instructions executable by a malware detection device for programming the malware detection device to perform one or more operations. The set of instructions might include instructions to perform one or more operations in accordance with methods provided by various embodiments, such as some or all of the instructions described above, to name one non-limiting example.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1A:
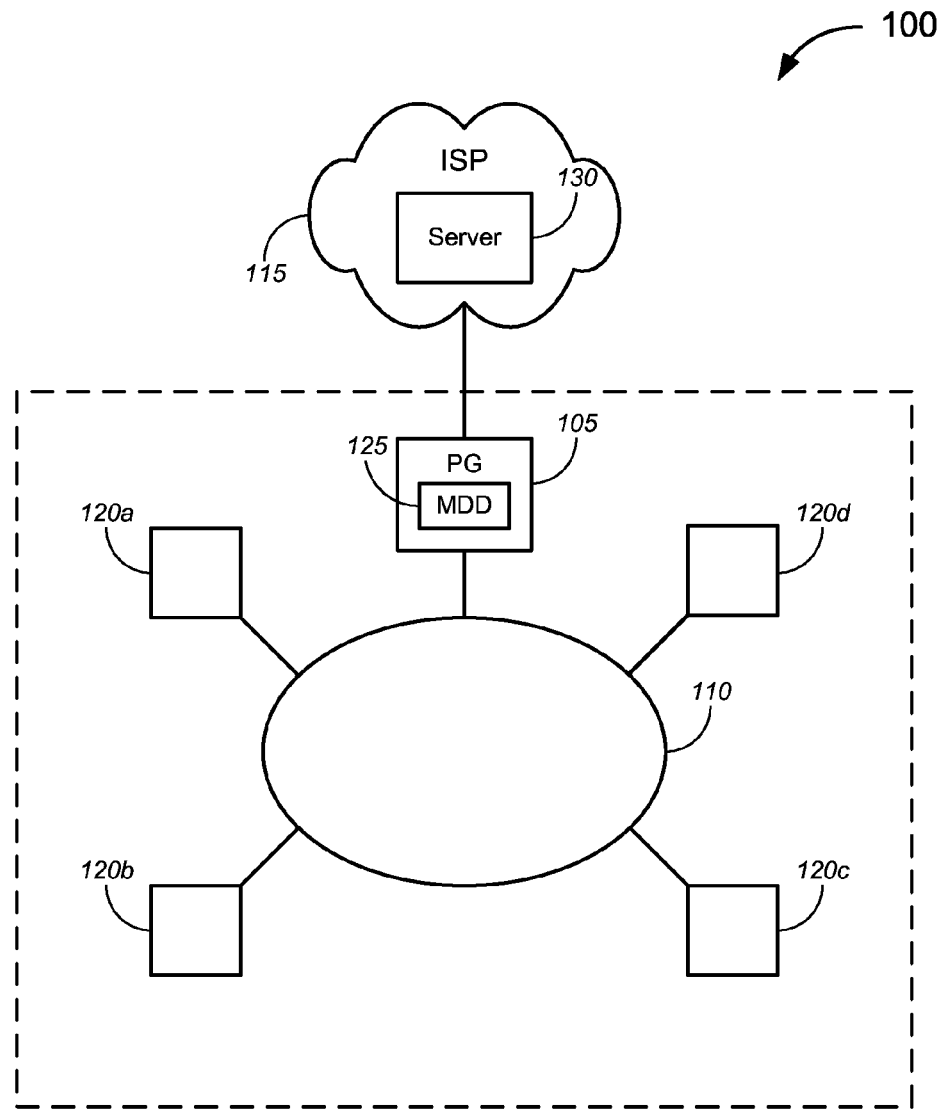
FIGS. 1A, 1B, and 1C are block diagrams illustrating systems for identifying infected devices, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Exemplary embodiments provide improved solutions for detecting and/or treating malware on a subscriber's premise network. Such solutions can include, but are not limited to, tools and techniques that can detect, and/or enable the detection of, malware infections on individual customer devices within the customer's network. Such tools and techniques can be employed to detect, identify, and/or remove malware on devices that are unidentifiable in an ISP's network, due to the use of NAPT and/or a firewall at the customer premises or because of other factors. Hence, such solutions can provide significantly enhanced capabilities for fighting malware infestations, providing greater customer satisfaction and increased network (and personal computer) security without requiring extensive modification of existing network architectures or device, and without imposing onerous obligations on customers.

In a particular embodiment, for example, a premise gateway, or other device on the customer's premise network (referred to generally as a "malware detection device"), is configured to analyze packets traveling through the premise gateway. A variety of different techniques can be used for such analysis, including the comparison of packets to malware signatures and/or other heuristic techniques. In some cases, the malware detection device can obtain such signatures and/or heuristics from, e.g., a server in the ISP network and/or a server operated by the ISP. Based on the analysis of the traffic (e.g., IP packets), the malware detection device can identify one or more subscriber devices (e.g., by IP address, MAC address, etc.) that are infected with malware. This identification is possible, in some embodiments, because the packets on the premise network are addressed with the address of each device in the network (e.g., as a source address or destination address).

Because the malware detection device performs this analysis within the subscriber's premise network, such solutions are not affected by the use of NAPT or other address translation techniques within the premise gateway, which prevents reliable identification of individual subscriber devices based on analysis done within the ISP network. Moreover, in certain embodiments, the malware detection device (whether the premise gateway or another device on the premise network) can be operated and/or configured by the ISP. The transmission of malware signatures and/or heuristics to the malware detection device represents one form of such configuration. Additionally and/or alternatively, the malware detection device (and/or the premise gateway) might be configurable from the ISP regarding actions to take if malware is detected, etc. As such, these solutions do not require affirmative action (such as the installation or configuration of an antivirus program, the manual update of malware signatures, etc.) by the subscriber to enable the detection of malware.

As noted above, some embodiments provide for configuration and/or operation of the malware detection device by an ISP. Merely by way of example, certain embodiments employ premise gateways (e.g., broadband modems and/or routers, etc.) as the malware detection device. Such devices often are designed with very little memory beyond what is required for core gateway functionality, so it may be infeasible, in many cases, to provide comprehensive malware detection facilities (e.g., a complete library of known malware signatures and/or heuristics) within the gateway. Accordingly, certain embodiments allow for a device within the ISP network to detect a malware infection at particular subscriber premises, e.g., based on comprehensive analysis of packets received from the premise gateway for that subscriber. This analysis, in some cases, can identify the type of malware with which the subscriber is infected.

The ISP, then, can download to the subscriber's premise gateway (or other malware detection device) malware detection facilities (including, but not limited to, malware signatures heuristic algorithms, and/or the like) that are specific to the detected type of malware. Such embodiments can enable the detection of malware at the subscriber premises without requiring extensive modification of existing premise gateway hardware (e.g., memory, processors, etc.), because the premise gateway need not include an extensive library of generalized malware detection facilities; this library can be maintained at the ISP instead. If desired, such an arrangement can also avoid the need for periodic monitoring or updating within the premises, because the malware detection device might need to be activated only upon detection by the ISP; likewise, after detection by the ISP, up-to-date detection facilities can be provided as needed to the malware detection device at the customer premises, avoiding the need for periodic updates. (Of course, in other embodiments, the malware device might be constantly active and/or updated, depending on the implementation.) In other embodiments, the ISP might tunnel traffic from the premise network to a location in the ISP's network (e.g., using GRE, MPLS, LT2P tunnels and/or other VPN/tunneling technologies familiar to the skilled person), to allow for more detailed analysis of the traffic to identify infected devices.

Other embodiments can provide facilities to alert a subscriber to the presence of malware within the subscriber's network and/or can help the subscriber identify the particular device(s) on the network that are infected. Merely by way of example, the malware detection device might configure the premise gateway to block outgoing traffic from devices that are determined to be infected with malware. Additionally and/or alternatively, the malware detection device can be configured to actively notify the user about an infected device, e.g., by serving a web page to the infected device (and/or another device) informing the user that the device is infected, for example, by altering resolution of DNS traffic to direct the subscriber to a notification web page. In some cases, these techniques can be combined, such that the malware detection device might block an outgoing request from a web browser on the infected device and instead return a web page including a notification of the infection. In cases in which the malware detection device is separate from the premise gateway, the malware detection device might configure the gateway to perform one or more of these actions.

In some cases, the malware detection device (or other system components) might interface with other devices, such as subscriber premises equipment, to provide notifications. Merely by way of example, the system might interact with a subscriber's set-top box (e.g., in an IPTV environment) to provide notification to the subscriber via the subscriber's television and/or with streaming media.

Certain embodiments can provide assistance to the subscriber in treating the malware infection, e.g., by identifying infected devices (by MAC address, device type, etc.) to the subscriber and/or to a technician at the ISP. Based on the identification, the malware detection device (and/or the technician, e.g., in a chat, telephone call, etc.) can provide malware treatment software and/or instructions (which might be as detailed and/or device-specific as appropriate or desired) to the subscriber to help the subscriber remove the malware from the infected device(s). In some cases, for example, a web page served by the malware detection device (and/or the premise gateway) notifying the user of the infection might also include instructions on how to remove the infection. Such instructions might include a link to a server at the ISP (or elsewhere) where detailed instructions and/or removal software can be obtained. Alternatively and/or additionally, the malware detection device and/or the ISP might provide similar information and/or resources in an email sent to the customer (e.g., to a customer email address on file with the ISP).

Figure 1B:
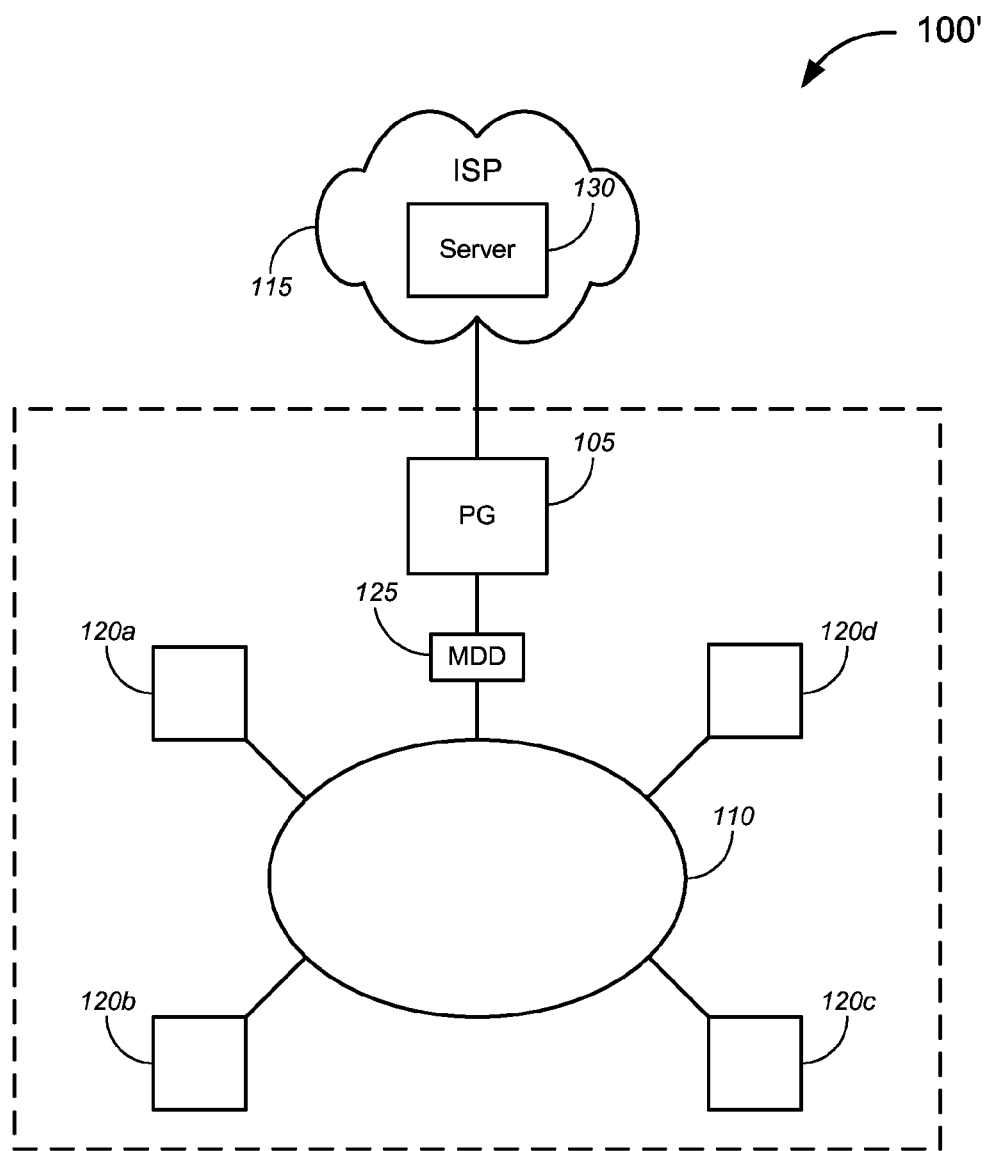

FIG. 1A illustrates a system 100 that can be used to detect a malware infection at a subscriber premises. The system comprises a premise gateway 105, which as noted above, can include a broadband modem (e.g., xDSL modem, cable modem, etc.), wireless (and/or wired) router, wireless access point, and/or any other hardware or software that can provide network access for the customer premises (indicated by the broken lines on FIG. 1). In an embodiment, the premise gateway includes a first interface (internal) in communication with a premise network 110 and a second (external) interface in communication with an ISP network 115 (which can provide communication with, inter alia, the Internet, which is not shown on FIG. 1A). Such interfaces can be any suitable interface, and the interface with the ISP network 115 might be different than the interface with the premise network 110, as is known in the art. Merely by way of example, in some cases, the external interface of the premise gateway 105 might include a coaxial cable (e.g., cable television) interface for communicating via DOCSIS or the like, a twisted pair interface for communicating over Ethernet or DSL (or analog POTS, ISDN, etc.), a wireless interface for communicating via 3G, 4G, and/or WiMAX wireless protocols, or the like. The internal interface of the premise gateway 105 might also include an Ethernet interface (or a plurality of Ethernet interfaces, if the gateway 105 also serves as a router for the premise network 110), a wireless interface (e.g., an 802.11 or other WLAN interface) and/or the like. Any suitable interface combination (of which many are known in the art) can be used by the premise gateway 105, so long as the premise gateway 105 can provide communication between the premise network 110 and the ISP network 115.

The premise network 110 can be any suitable type of network (including without limitation, a wired network, a wireless network, or some combination of a wired and wireless network) and it provides communication between the premise gateway and a plurality of customer devices 120, which are generally (but not necessarily always) located at the customer premises. Such devices 120 can include any devices that are capable of communicating over a network (and in particular, the premise network 110), such as (but not limited to) personal computers, wireless phones, tablet computers, handheld computers, video game consoles, audio/video devices (such as stereo receivers, set-top boxes, network video appliances, and the like), network-attached storage devices, and/or the like. Some or all of these devices might communicate with the ISP network 115 and/or the Internet (e.g., through the ISP network 115 and/or, at times, over a separate connection to the Internet, such as through a wireless provider in the case of a wireless phone, through another Internet connection away from the premise, in the case of a laptop computer, and/or the like).

Due, at least in part, to the connectivity of these devices 120 to the Internet, it is possible that one or more of the devices might become infected with malware at some point in time. As such, the system 100 can include, in some embodiments, a malware detection device 125, which is part of the premise network 110. More specifically, in many embodiments, the premise gateway 105 serves to isolate, to some extent, the premise network 110 from the ISP network 115. As such, one skilled in the art will recognize, the premise network 110, and the devices 120 attached thereto, is largely opaque to the ISP (through the use of NAPT, as described above, and/or through other routing and network isolation techniques). In an aspect, the malware detection device 125 resides on the premises side of this demarcation, such that premise network 110, and the devices 120, are visible to the malware detection device 125; more to the point, the malware detection device 125, being situated within the premise network 110, has access to network traffic from the devices 120 before that traffic passes through the premise gateway 105 and is modified (e.g., using NAPT, etc.) for transport to the ISP network 115.

Figure 1C:
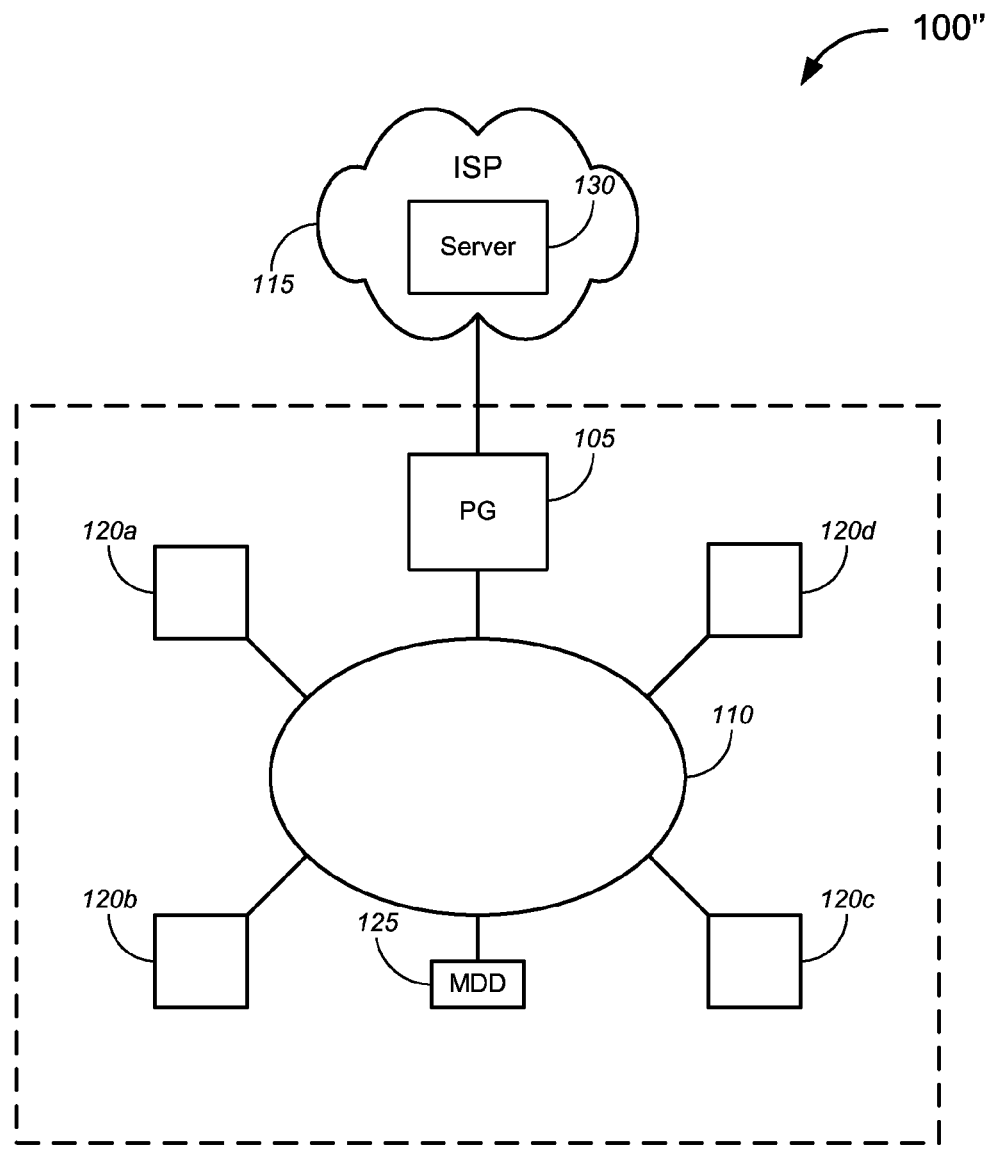

The malware detection device 125 can take many forms. For example, as illustrated by FIG. 1A, the premise gateway 105 can comprise (and/or perform the functions of) the malware detection device 125 in some embodiments. In other embodiments, as illustrated by the systems 100' and 100" of FIGS. 1B and 1C, the malware detection device 125 might be a separate device from the premise gateway 105. In such embodiments, the malware detection device 125 might be attached to the premise network 110. Depending on the implementation, the malware detection device 125 might be disposed between the premise gateway 105 and the premise network 110, as shown on FIG. 1B, such that all traffic on the premise network 110 travels through the malware detection device 125 before reaching the premise gateway 105 (and/or being routed by the premise gateway 105 to the ISP network 115). Alternatively and/or additionally, the malware detection device 125 might be located elsewhere on the premise network 110, as illustrated by FIG. 1C. The location of the malware detection device 125 is discretionary, so long as the malware detection device 125 has access to network traffic generated by (and/or addressed to) the devices 120 on the premise network 110. (Moreover, as noted above, in some embodiments, some or all of the functionality of the malware detection device 125 might be implemented in a device within the ISP network 115, and/or such a device might have visibility to individual devices in the premise network 110 through a tunnel or VPN, e.g., between the device in the ISP network 115 and the premise gateway 105).

The functions of the malware detection device 125 can be performed by different devices, in accordance with various embodiments. Merely by way of example, the malware detection device 125 might be incorporated within a bridge in the premise network 110. In other cases, the malware detection device 125 might be implemented by a personal computer in the premise network 110; the personal computer might have additional functionality, such that it might also be able to act as one of the customer devices 120, and the malware detection device functionality might be implemented by a program running on the personal computer; in other cases, the personal computer might be programmed to function only as a malware detection device 125. In other cases, the malware detection device 125 might be implemented as an appliance that can be installed by the ISP and/or given by the ISP to the customer and inserted into the premise network 110 by the customer (e.g., by plugging an Ethernet cable into a port on the appliance, by configuring a wireless radio, etc.).

In some embodiments, the system 100 will include a server 130, which might be in the ISP network or elsewhere (e.g., on the Internet) and/or might be operated by the ISP. The server 130, in an aspect, can configure and/or control the operation of the malware detection device 125. Merely by way of example, in some cases, the server 130 (or another device in the ISP network, such as an edge router, etc.) might be configured to analyze network traffic received from the premise gateway 105. If a malware infection is detected and/or the malware is specifically identified, the server 130 might be configured to activate the malware detection device 125 to begin detecting malware in the premise network 110. Alternatively and/or additionally, the server 130 might configure the malware detection device 105 by sending appropriate malware signatures and/or heuristic algorithms to the malware detection device 105 to assist in the detection of the identified malware in the premise network 110. In other cases, the server 130 might configure the malware detection device 125 and/or the premise gateway 105 to cause those device(s) to take specific actions, as described elsewhere herein, in response to the detection of malware at one of the devices 120 on the premise network 110.

Figure 2:
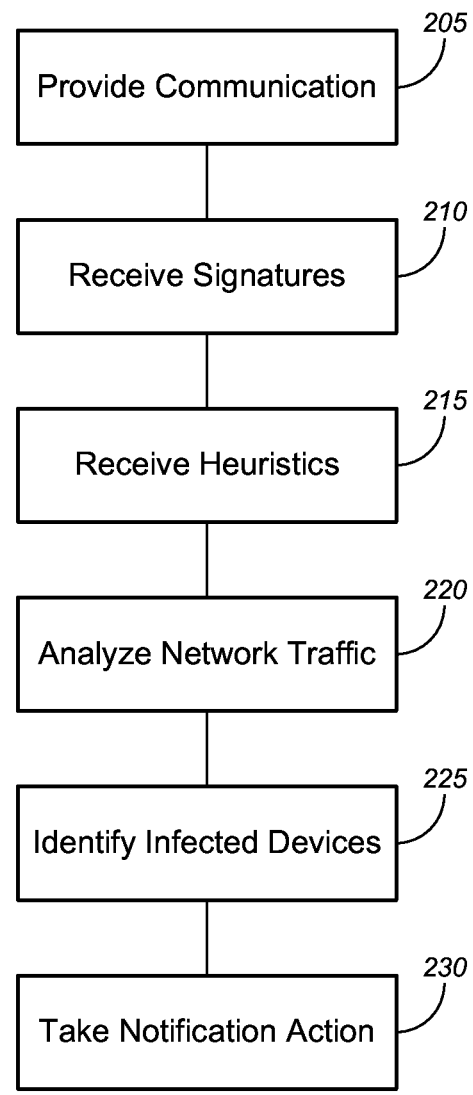
FIG. 2 is a process flow diagram illustrating a method of identifying infected devices, in accordance with various embodiments.
Figure 3:
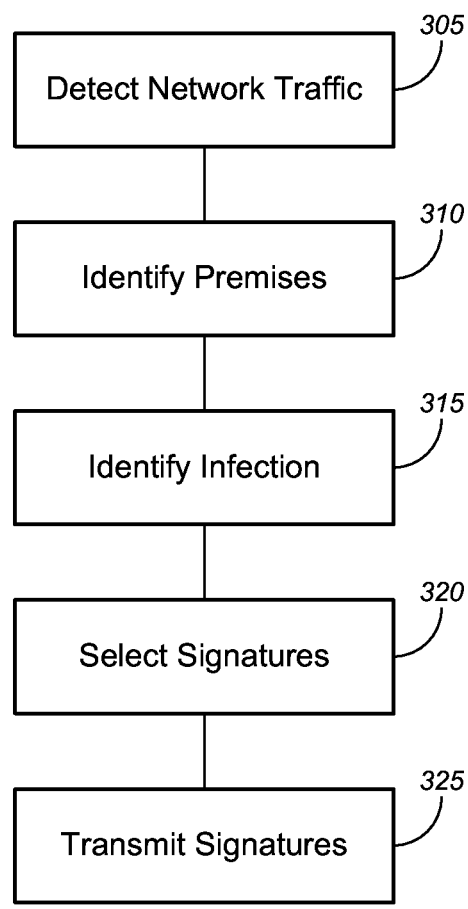
FIG. 3 is a process flow diagram illustrating a method of providing malware identification tools to customer premises, in accordance with various embodiments.

FIG. 2 illustrates a method of detecting malware at customer premises, and FIG. 3 illustrates a method of providing malware identification tools to a malware detection device. While the methods of FIGS. 2 and 3 are illustrated, for ease of description, as different methods, it should be appreciated that the various techniques and procedures of these methods can be combined in any suitable fashion, and that, in some embodiments, the methods depicted by FIGS. 2 and 3 can be considered interoperable and/or as portions of a single method. Similarly, while the techniques and procedures are depicted and/or described in a certain order for purposes of illustration, it should be appreciated that certain procedures may be reordered and/or omitted within the scope of various embodiments. Moreover, while the methods illustrated by FIGS. 2 and 3 can be implemented by (and, in some cases, are described below with respect to) the systems 100, 100', and 100" of FIGS. 1A-1C (or components thereof, such as the premise gateway 105, malware detection device 125 and/or server 130), these methods may also be implemented using any suitable hardware and/or software implementation. Similarly, while the systems of FIGS. 1A-1C (and/or components thereof) can operate according to the methods illustrated by FIGS. 2 and 3 (e.g., by executing instructions embodied on a computer readable medium), the systems can also operate according to other modes of operation and/or perform other suitable procedures.

The method 200 of FIG. 2 comprises providing (e.g., with a premise gateway) communication between a premise network at a customer premises and an external network outside the customer premises (block 205). In an exemplary embodiment, the external network is an ISP network and/or the Internet. In an aspect, the premise network comprises (i.e., provides communication between) a plurality of customer devices, such as those described above. In another aspect, the premise network provides communication (e.g., through the premise gateway) between some or all of these devices and the ISP network/Internet.

In some cases, a malware detection device (which, again, can be the premise gateway or another device) receives one or more malware signatures (block 210), e.g., from a server operated by the ISP or another entity. Alternatively and/or additionally, the malware detection device might receive heuristic algorithms (e.g., from a similar source) at block 215. These signatures and/or heuristic algorithms can be used by the malware detection device to analyze network traffic on the premise network and/or between the premise network and the external network (block 220).

One skilled in the art will appreciate that malware signatures generally can be used to compare a dataset (e.g., one or more network packets, in a particular embodiment) with a similar dataset known to be associated with and/or caused by malware. Merely by way of example, if a particular strain of malware is known to cause an infected computer to transmit IP packets to a particular destination address and/or with a particular payload, analysis of the network traffic might comprise comparing the network traffic against such signatures, for example, by examining packets (e.g., using deep packet inspection ("DPI") techniques to determine whether any packets are addressed to the particular destination address and/port(s) and/or contain the particular payload.

Conversely, a heuristic algorithm might not be based on a particular strain of malware's behavior but instead might screen for activity (e.g., network activity) that is deemed to be generally suspicious, such as packets directed to rarely used ports on remote machines, etc. By applying such heuristics to the network traffic, a malware detection device can identify suspicious packets that can indicate a malware infection, even if that specific type of malware has not been identified by malware researchers and/or of no signatures specific to that type of malware have yet been developed and/or provided to the malware detection device.

Either (or both) malware signatures and heuristics can be used to analyze network traffic in accordance with various embodiments, and other malware detection techniques can be used in accordance with other embodiments. It should be noted, however, that certain embodiments, because they analyze network traffic at the premise network, do not require particular malware detection software to be installed on the various customer devices. (Of course, it should be noted as well that, in various embodiments, nothing would preclude the installation of such detection software, either).

At block 225, the malware detection device identifies one or more infected devices on the premise network. This identification, in an embodiment, is based on the analysis of the network traffic. Merely by way of example, if the malware detection device identifies (either through signature comparison, heuristic application, and/or some other technique) one or more IP packets as indicating a malware infection, the malware identification device can identify the source address for those packets. This source address can provide a network identifier (e.g., an IP address, a media access control ("MAC") address, etc.) of the device that generated the packets, and this device can be identified as being infected with malware.

At block 230, the method 200 comprises taking one or more actions to notify the customer of the identification of the device(s) that is/are infected with malware. In some cases, the premise gateway and/or the malware detection device perform these notification actions. A variety of different notification actions are possible, in accordance with various embodiments.

Merely by way of example, in some cases, the malware detection device and/or the premise gateway might block outgoing traffic originating from a device that has been identified as infected by malware. (If the malware detection device is not part of the premise gateway and the architecture of the premise network does not allow the malware detection device to block outgoing traffic on its own, the malware detection device and/or a server at the ISP might configure the premise gateway, using a variety of available configuration tools, to block such traffic.) In some cases, merely blocking the traffic from a device might be sufficient to indicate to the customer that the device is infected.

In other cases, however, additional notification options might be desirable. For instance, providing a notification might comprise causing the infected device to display a webpage indicating effective status of that device (e.g., through DNS redirection or any other suitable technique), and/or causing another (perhaps non-infected) device to display webpage indicating which device(s) on the network have been identified as infected. This type of notification can be performed additionally and/or alternatively to blocking traffic from the affected device(s). Merely by way of example, the premise gateway and/or the malware detection device may be configured to block an outbound HTTP GET request from an infected device (or another device) and instead return, in response to the request, a webpage indicating the status of any infected devices on the premise network. This webpage might also indicate the status of any devices that have not been identified as being infected (i.e., devices from which no infection-indicating network traffic has been received by the malware detection device), to provide further information to the customer about which devices need to have infections removed and which devices do not.

Other notification options are possible as well. Merely by way of example, the malware detection device might be configured to send an e-mail message (or a text message, etc.) to the customer to inform the customer of the identified infection. In other cases, notifications might be provided through other customer devices, such as a set top box. Merely by way of example, the set top box might display a video (or still image) notification when the customer turns on the television. Such notifications might be provided to the set-top box from the malware detection device and/or directly from the ISP.

In some cases, the malware detection device might send a notification to the ISP (e.g., via communication with the server, an e-mail message to the ISP, and/or the like) via the external network, so that the ISP can contact the customer to inform the customer of infection. Such notification to the ISP might include, without limitation, identification of the affected device, e.g., by MAC address, IP address, hostname, device type, and/or any other possible identification information that can be obtained by the malware detection device. Merely by way of example, if network traffic from a particular device indicates that device is infected with malware, the network traffic might be further analyzed to obtain additional identifying information about the device, such as HTTP User_Agent strings and/or other HTTP request information, netbios information, MAC device information, unique device or operating system packet identification characteristics, application identification information, unique patterns of communication (most communications going to a video streaming provider for example) and/or the like.

In some cases, notifying the customer of the malware infection can also include assisting the customer in removing the malware from the infected device. Merely by way of example, if the notification comprises providing the customer with a webpage or email message indicating the infection, that webpage (or email message) could also include instructions on how to remove the malware. Such instructions might take the form of steps to be taken by the customer to remove the malware, a contact number for technical support personnel at the ISP or elsewhere, who can help the customer with the removal process, and/or the like. In some cases, the webpage (or e-mail message etc.) might include a link to download malware removal software, a link to a webpage operated by the ISP (or another) with more detailed instructions for removal of malware, and/or the like. Hence, in these (and other) ways, notifying the customer of the malware infection may include providing the customer with software specific to the infected devices (e.g., based on the hardware, operating system, etc. of the affected devices) and/or specific to the malware with which the devices are infected.

As noted above, for a variety of reasons, it may be undesirable to provide for the malware detection device at the customer premises to perform generalized malware detection. Such reasons can include hardware limitations of the malware detection device, the difficulty of keeping such devices updated, and/or the like. (It should be recognized, however, that some embodiments do provide from our detection device to perform generalized malware detection.) In either case, it can be helpful to provide an automated way for the malware detection device to receive up-to-date configuration information, including malware signatures and/or heuristics. Hence, FIG. 3 illustrates a method 300 of providing malware identification tools to a malware detection device.

In some embodiments, the method 300 comprises analyzing, at the ISP (and/or at a device in the ISP, such as a server dedicated to the process, an edge router, a core router, etc.) network traffic received from (and/or addressed to) the premise gateway and, based on that analysis, detecting network traffic that indicates a potential malware infection at one or more of the customer devices at the customer's premise network (block 305). As noted above, it can be difficult, in the ISP network to identify a specific device that is infected, but the ISP may be able to detect that at least one device that is connecting through a particular premise gateway is infected, using detection techniques similar to those employed by the malware detection device described above.

At block 310, the ISP (or a device at the ISP) identifies the premises that include an infected device, e.g., by identifying the premise gateway from which the network traffic originated, and at block 315, the ISP identifies (when possible) one or more strains of malware with which the customer premises potentially is infected (e.g., by determining that the network traffic matches a signature for a particular strain. It is anticipated that, unlike the premises-based malware detection devices (at least in some embodiments), the analysis device at the ISP will be configured with an up-to-date and comprehensive set of malware signatures. As such, the ISP, although it cannot identify a particular infected device on the premise network, often will be able to identify specifically which malware potentially has infected the device(s) (block 315). Additionally and/or alternatively, trusted third parties might provide the ISP with infection information. Based on the identification of the potential infection, at block 320, the server at the ISP can select one or more malware signatures and/or heuristic algorithms that can be used by the premises-based malware detection device to detect malware on the premise network and/or to identify infected device(s) on the premise that work, for example as described above. These signatures, along with any other appropriate configuration information, such as instructions to activate and begin analyzing network traffic, can be sent to the malware detection device at the customer premises (block 325). After receiving such signatures, heuristics, and/or instructions, the malware detection device at the customer premises can perform the malware detection and identification procedures, e.g., described above with respect to FIG. 2.

Figure 4:
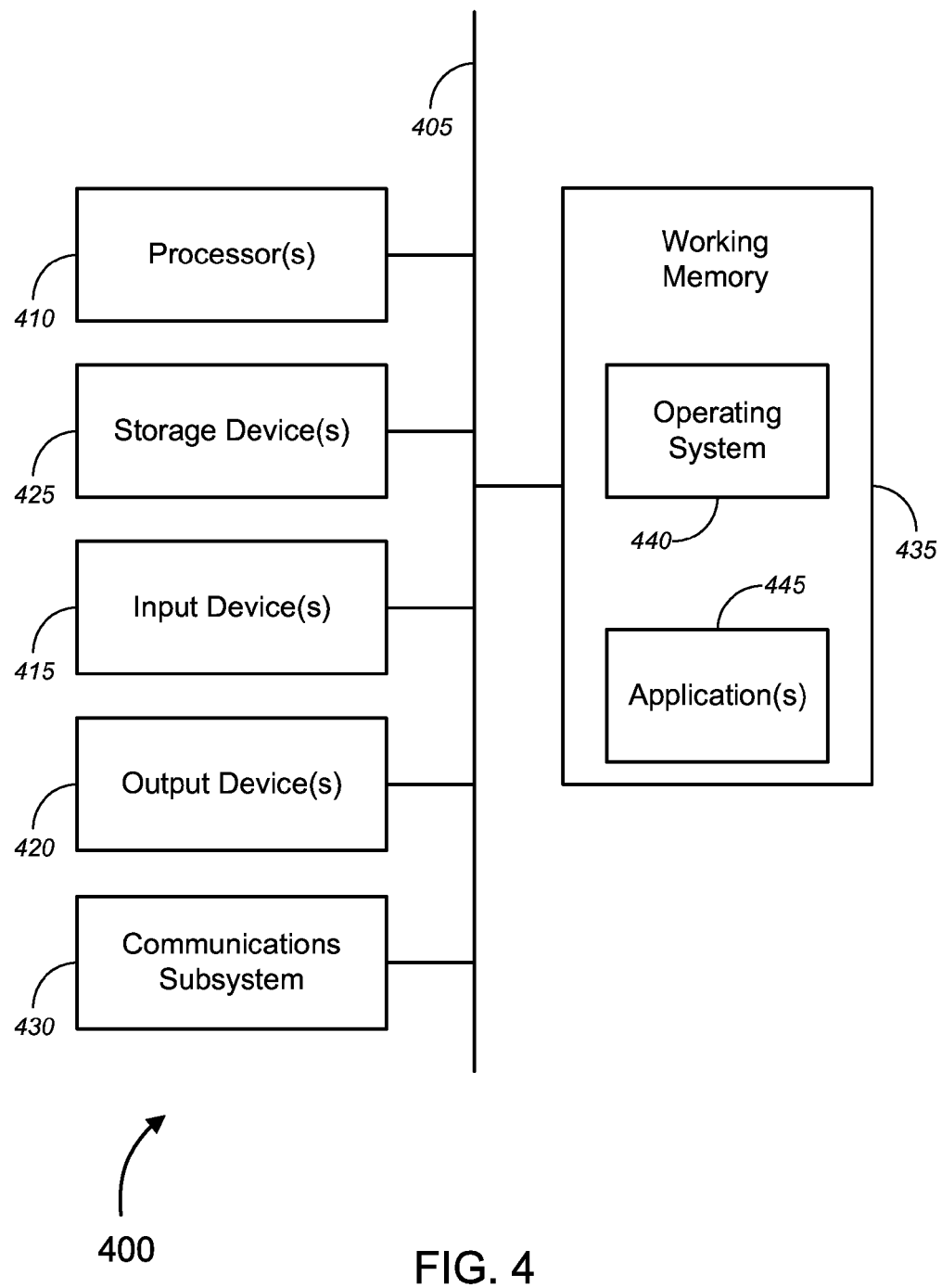
FIG. 4 is a generalized schematic diagram illustrating a computer system, in accordance with various embodiments.

FIG. 4 provides a schematic illustration of one embodiment of a computer system 400 that can perform the methods provided by various other embodiments, as described herein, and/or can function as a server, a premise gateway, a malware detection device, and/or a customer device, as described above. It should be noted that FIG. 4 is meant only to provide a generalized illustration of various components, of which one or more (or none) of each may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include one or more processors 410, including without limitation one or more general-purpose processors and/or one or more special-purpose processors (such as digital signal processing chips, graphics acceleration processors, and/or the like); one or more input devices 415, which can include without limitation a mouse, a keyboard and/or the like; and one or more output devices 420, which can include without limitation a display device, a printer and/or the like.

The computer system 400 may further include (and/or be in communication with) one or more storage devices 425, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 400 might also include a communications subsystem 430, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 430 may permit data to be exchanged with a network (such as the network described below, to name one example), with other computer systems, and/or with any other devices described herein. In many embodiments, the computer system 400 will further comprise a working memory 435, which can include a RAM or ROM device, as described above.

The computer system 400 also may comprise software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another computer readable medium, such as one or more of the storage device(s) 425. Merely by way of example, execution of the sequences of instructions contained in the working memory 435 might cause the processor(s) 410 to perform one or more procedures of the methods described herein.

The terms "machine readable medium" and "computer readable medium," as used herein, refer to any medium that participates in providing data that causes a machine to operation in a specific fashion. In an embodiment implemented using the computer system 400, various computer readable media might be involved in providing instructions/code to processor(s) 410 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 425. Volatile media includes, without limitation, dynamic memory, such as the working memory 435. Transmission media includes, without limitation, coaxial cables, copper wire and fiber optics, including the wires that comprise the bus 405, as well as the various components of the communication subsystem 430 (and/or the media by which the communications subsystem 430 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc. carried by the signals) to the working memory 435, from which the processor(s) 405 retrieves and executes the instructions. The instructions received by the working memory 435 may optionally be stored on a storage device 425 either before or after execution by the processor(s) 410.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of identifying a malware infection, the method comprising:

providing, with a premise gateway, communication between a premise network at a customer premises and an external network outside the customer premises, the premise network comprising a plurality of customer devices, wherein the customer premises is a single-family home and the premise gateway is a residential gateway;

analyzing, with a malware detection device at the customer premises, network traffic between the premise network and the external network;

tunneling, based on analysis of the network traffic by the malware detection device, traffic from the premise gateway over a virtual private network tunnel to a specified location in an Internet Service Provider network for further analysis of the network traffic;

identifying, with the malware detection device, one or more infected customer devices that are infected with malware, based on analysis of the network traffic; and taking, with at least one of the malware detection device or the premise gateway, one or more actions to notify the customer of an identification of the one or more infected customer devices, wherein the one or more actions comprise performing domain name service ("DNS") redirection to redirect hypertext transfer protocol ("HTTP") requests from the one or more infected customer devices to a webpage indicating the status of the one or more infected customer devices.

2. The method of claim 1, further comprising:

receiving, at the malware detection device, a set of one or more malware signatures via the external network;

wherein analyzing the network traffic comprises comparing the network traffic against one or more of the one or more malware signatures.

3. The method of claim 2, further comprising:

detecting, at an Internet service provider (ISP), network traffic from the premise gateway indicating a malware infection of one or more of the customer devices; and transmitting, from the ISP, the set of one or more malware signatures, in response to detecting network traffic from the premise gateway indicating a malware infection of one or more of the customer devices.

4. The method of claim 3, further comprising:

identifying, at the ISP, one or more potential malware infections, based on the network traffic from the premise gateway; and selecting the one or more malware signatures based on identification of the one or more potential malware infections.

5. The method of claim 1, wherein analyzing network traffic comprises applying one or more heuristics to the network traffic.

6. The method of claim 5, further comprising:

receiving, at the premise gateway, the heuristics over the external network.

7. The method of claim 1, wherein taking one or more actions to notify the customer further comprises blocking at least some of the network traffic originating from the one or more infected customer devices.

8. The method of claim 1, wherein taking one or more actions to notify the customer further comprises causing a customer device other than the one or more infected customer devices to display a web page indicating an infected status of the one or more infected customer devices.

9. The method of claim 1, wherein taking one or more actions to notify the customer further comprises sending an email message to the customer.

10. The method of claim 1, wherein taking one or more actions to notify the customer further comprises sending a text message to the customer, the text message being selected from the group consisting of an instant message and a simple message service (SMS) message.

11. The method of claim 1, wherein taking one or more actions to notify the customer further comprises transmitting a notification to an Internet service provider (ISP) of the customer via the external network.

12. The method of claim 11, further comprising:

the ISP contacting the customer to notify the customer of the one or more infected devices and assist in removing the malware from the one or more infected devices.

13. The method of claim 1, wherein taking one or more actions to notify the customer further comprises providing the customer with instructions on removing the malware from the one or more infected customer devices.

14. The method of claim 1, wherein taking one or more actions to notify the customer further comprises providing the customer with malware removal software specific to the one or more infected customer devices.

15. The method of claim 1, wherein taking one or more actions to notify the customer further comprises transmitting a notification to a set top box at the customer premises, for display to the customer on a television screen.

16. The method of claim 1, wherein identifying the one or more infected customer devices further comprises determining a network identifier of each of the one or more infected customer devices.

17. The method of claim 1, wherein the premise gateway comprises the malware detection device.

18. The method of claim 1, wherein the premise gateway comprises a broadband modem.

19. The method of claim 1, wherein the premise gateway comprises a router.

20. The method of claim 1, wherein the premise gateway comprises a wireless access point.

21. The method of claim 1, wherein the malware detection device comprises a bridge in the premise network.

22. The method of claim 1, wherein the malware detection device comprises a personal computer in the premise network.

23. A malware detection device, comprising:

a first communication interface in communication with a premise network at a customer premises;

a second communication interface to provide communication, with a premise gateway that provide communication with an external network outside the customer premises;

one or more processors in communication with the first and second communication interfaces; and a computer readable medium in communication with the one or more processors, the computer readable medium having encoded thereon a set of instructions executable by the processor for programming the malware detection device to perform one or more operations, the set of instructions comprising:

instructions to provide communication between a premise network at a customer premises and an external network outside the customer premises, the premise network comprising a plurality of customer devices, wherein the customer premises is a single-family home and the premise gateway comprises a residential gateway;

instructions to analyze network traffic between the premise network and the external network;

instructions to cause one or more network devices to tunnel, based on analysis of the network traffic by the malware detection device, traffic from the premise gateway over a virtual private network tunnel to a specified location in an Internet Service Provider network for further analysis of the network traffic;

instructions to identify one or more infected customer devices that are infected with malware, based on analysis of the network traffic; and instructions to take one or more actions to notify the customer of an identification of the one or more infected customer devices, wherein the instructions to take one or more actions comprise instructions to implement domain name service ("DNS") redirection at the premise gateway to redirect hypertext transfer protocol ("HTTP") requests from the one or more infected customer devices to a webpage indicating the status of the one or more infected customer devices.

* * * * *